(12) United States Patent
Iizuka

(10) Patent No.: US 6,493,126 B1
(45) Date of Patent: Dec. 10, 2002

(54) SCANNING LENS AND SCANNING OPTICAL SYSTEM

(75) Inventor: Takashi Iizuka, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/716,292

(22) Filed: Nov. 21, 2000

(30) Foreign Application Priority Data

Nov. 22, 1999 (JP) ............................................ 11-331953

(51) Int. Cl.[7] .............................................. G02B 26/08
(52) U.S. Cl. ...................................... 359/205; 359/570
(58) Field of Search ................................ 359/196, 197, 359/205, 206, 207, 208, 212, 216, 217, 218, 219, 569, 570, 571, 738

(56) References Cited

U.S. PATENT DOCUMENTS

| | | | | |
|---|---|---|---|---|
| 6,115,164 A | | 9/2000 | Kamikubo | ............ 359/196 |
| 6,124,962 A | | 11/2000 | Kamikubo | ............ 359/205 |
| 6,201,626 B1 | * | 3/2001 | Kamikubo | ............ 359/205 |
| 6,222,661 B1 | * | 4/2001 | Takeuchi et al. | ............ 359/205 |
| 6,259,547 B1 | * | 7/2001 | Kamikubo | ............ 359/205 |
| 6,260,763 B1 | * | 7/2001 | Svetal | ............ 359/205 |

FOREIGN PATENT DOCUMENTS

| | | |
|---|---|---|
| EP | 0967508 | 12/1999 |
| JP | 10197820 | 7/1998 |
| JP | 2000-81584 | 3/2000 |

* cited by examiner

Primary Examiner—Cassandra Spyrou
Assistant Examiner—Euncha Cherry
(74) Attorney, Agent, or Firm—Greenblum & Bernstein, P.L.C.

(57) ABSTRACT

Disclosed is a scanning optical system, which is provided with a light source portion, a deflector, which deflects a beam emitted from said light source portion, and a scanning lens for converging the beam deflected by the deflector onto a surface to be scanned. The scanning lens has a positive power as a whole, and includes a plurality of refractive lens elements. Further, a diffractive lens structure is formed on at least one surface of one of the plurality of lens elements of the scanning lens. The diffractive lens structure is defined by an optical path difference function that is asymmetrical with respect to the optical axis of the refractive lens in the main scanning direction, which is counterbalanced with an asymmetrical movement of a deflecting point, compensating a lateral chromatic aberration.

10 Claims, 5 Drawing Sheets

LATERAL CHROMATIC
ABERRATION
(SYMMETRICAL)

LATERAL CHROMATIC
ABERRATION
(ASYMMETRICAL)

100 # SCANNING LENS AND SCANNING OPTICAL SYSTEM

BACKGROUND OF THE INVENTION

The present invention relates to a scanning lens whose lateral chromatic aberration is compensated by means of a combination of a refractive lens and a diffractive lens structure. The invention also relates to a scanning optical system that uses such a scanning lens.

These kinds of scanning optical systems are disclosed in, for example, U.S. Pat. No. 6,124,962. In the scanning optical system disclosed in the above patent, a beam emitted from a light source is deflected by a deflector (i.e., a polygon mirror), and is converged through a scanning lens (i.e., an fθ lens) to form a spot on a surface to be scanned such as a surface of a photoconductive drum. The beam spot formed on the surface to be scanned moves (i.e., scans) on the surface in a main scanning direction as the polygon mirror rotates. The fθ lens consists of three refractive lens elements. One lens surface of the refractive lens elements is formed with a diffractive lens structure to compensate a lateral chromatic aberration due to dispersion of the refractive lens elements. The diffractive lens structure is similar to a Fresnel lens. A large number of concentric relief patterns, each of which has a wedge sectional shape, are formed on a refractive lens surface. The relief patterns are symmetrical with respect to the optical axis of the fθ lens.

In this specification, a direction equivalent to the scanning direction of the beam spot on the surface to be scanned is referred to as a main scanning direction, a direction perpendicular to the main scanning direction on the surface to be scanned is referred to as the auxiliary scanning direction. Shapes and orientations of powers of respective optical elements will be defined on the basis of these scanning directions. Further, a plane including the scanning beam scanning in the main scanning direction is referred to as a main scanning plane. The main scanning plane is perpendicular to the rotation axis of the deflector.

In the scanning optical system disclosed in the patent, the respective optical elements such as the light source, the polygon mirror and the fθ lens are arranged such that a central axis of the beam incident on the polygon mirror exists in the main scanning plane and the beam incident on the polygon mirror travels along a path that is different from the optical axis of the fθ lens.

However, the scanning optical system disclosed in the above US patent has such a weak point that the residual lateral chromatic aberration is asymmetrical and cannot be compensated. As disclosed in the patent, when the central axis of the beam incident on the polygon mirror exists in the main scanning plane and it travels along the path that is different from the optical axis of the fθ lens, a deflecting point, which is the point of intersection of the central axis of the beam incident on the polygon mirror and a reflecting surface of the polygon mirror, moves in the direction of the optical axis of the fθ lens and in the main scanning direction. The displacement of the deflecting point changes the lateral chromatic aberration on the surface to be scanned. Since the displacement of the deflecting point is asymmetrical with respect to the optical axis of the fθ lens in the optical system disclosed in the patent, the residual lateral chromatic aberration becomes also asymmetrical.

SUMMARY OF THE INVENTION

It is therefore an object of the invention to provide an improved scanning lens that is capable of reducing the asymmetrical component of the lateral chromatic aberration by means of the combination of the refractive lens and the diffractive lens structure. A further object of the present invention is to provide an improved scanning optical system that employs the scanning lens being free from the asymmetrical lateral chromatic aberration.

For the above object, according to the invention, there is provided a scanning lens, including a refractive lens, which includes at least one lens element, having a positive power as a whole, and a diffractive lens structure that is formed on at least one lens surface of the refractive lens for compensating a lateral chromatic aberration caused by the refractive lens, wherein the diffractive lens structure is defined by an optical path difference function that is asymmetrical with respect to the optical axis of the refractive lens in the main scanning direction. The optical path difference function is represented by a polynomial having odd order terms.

When the above-described scanning lens is applied to a scanning optical system where a central axis of a beam incident on a deflector exists in the main scanning plane, the asymmetrical component of the lateral chromatic aberration due to the displacement of the deflecting point can be counterbalanced with the asymmetry of the diffractive lens structure.

Further, a scanning optical system, for a writing device such as a printer, of the invention includes a light source portion, a deflector that deflects a beam emitted from the light source portion, and the above-described scanning lens that converges the beam deflected by the deflector onto a surface to be scanned. It is preferable that a central axis of the beam incident on the deflector exists in the main scanning plane and it travels along a path that is different from the optical axis. In this case, while the absolute value of an additional optical path length determined by the optical path difference function increases with distance from the optical axis of the scanning lens in the main scanning direction, the gradient of the function in the side of the beam incident on the deflector is preferably greater than that in the other side with respect to the optical axis.

Still further, a scanning optical system, for a reading device such as a scanner, of the invention includes the above-described scanning lens through which a light from an object to be read passes, a deflector that deflects a light passed through the scanning lens, and a photodetector that receives the light deflected by the deflector at a fixed position. It is preferable a central axis of the light incident on the photodetector exists in the main scanning plane and it travels along a path that is different from the optical axis. In this case, while the absolute value of the additional optical path length determined by the optical path difference function increases with distance from the optical axis of the scanning lens in the main scanning direction, the gradient of the function in the side of the light incident on the photodetector is preferably greater than that in the other side with respect to the optical axis.

DETAILED DESCRIPTION OF THE EMBODIMENT

A scanning optical system that employs a scanning lens embodying the invention will be described with reference to the accompanying drawings. The scanning optical system of the embodiment is adapted to be used in a writing device such as a laser beam printer.

Figure 1:
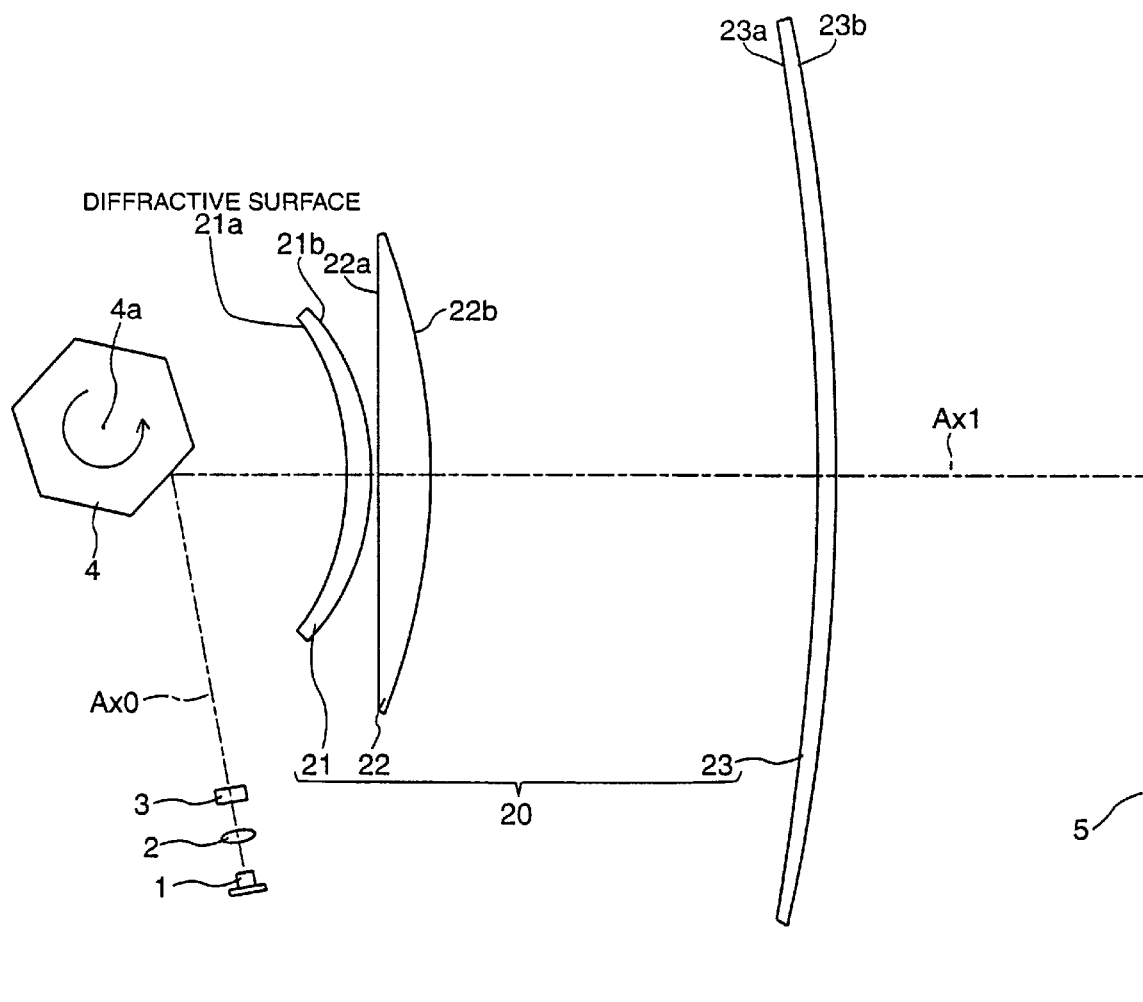
FIG. 1 is a diagram showing an arrangement of optical elements of a scanning optical system of a writing device viewed in the main scanning plane, embodying the invention.
Figure 2:
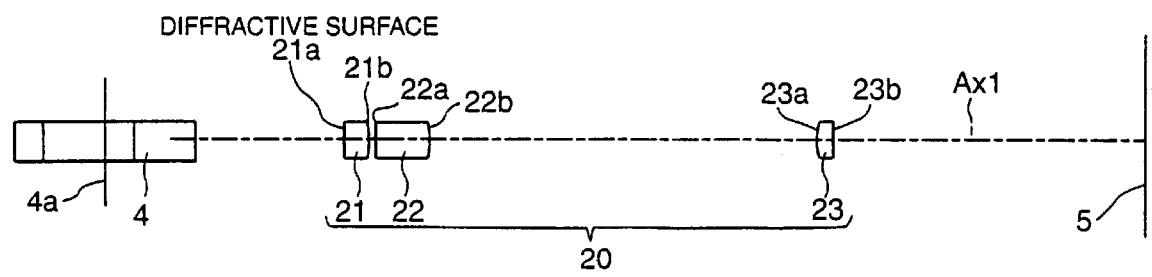
FIG. 2 is a diagram showing the scanning optical system of FIG. 1 viewed in the plane perpendicular to the main scanning direction.

FIG. 1 is a diagram of the scanning optical system according to the embodiment viewed in the main scanning plane, FIG. 2 is a diagram of the same viewed in the plane perpendicular to the main scanning direction.

A divergent laser beam emitted from a light source portion 1 such as a semiconductor laser is collimated by a collimator lens 2 and is converged by a cylindrical lens 3, which has a positive power in only the auxiliary scanning direction, to be incident on a polygon mirror 4. The laser beam deflected by a reflection surface of the polygon mirror 4 forms a beam spot on a surface 5 to be scanned through an fθ lens 20. The beam spot scans the surface 5 as the polygon mirror 4 rotates about a rotating axis 4a.

The light source portion 1 may be a multi-point emission semiconductor laser in case the scanning optical system is a multi-beam scanning optical system. Alternatively, beams from a plurality of different semiconductor lasers may be combined by employing a beam combiner. In such cases, spots corresponding to the plurality of beams should be arranged on the surface 5 to be scanned such that the spots are spaced apart, in the auxiliary scanning direction. Thus, a plurality of scanning lines are formed at one scanning.

The laser beam forms a line-spread image, once converged in the auxiliary scanning direction by the cylindrical lens 3, on or near the reflecting surface of the polygon mirror 4. The beam then again forms an image on the surface 5 to be scanned, again converged by means of the power of the fθ lens 20 in the auxiliary scanning direction. This structure prevents displacement of the scanning beam on the surface 5 due to a facet error of the reflecting surface of the polygon mirror 4.

The fθ lens 20 includes a first lens 21, a second lens 22 and a third lens 23, in this order from the polygon mirror 4 to the surface 5 to be scanned. The first lens 21 is a meniscus lens having positive powers in both of the main and auxiliary scanning directions. The second lens 22 is a plano-convex lens having positive powers in both of the main and auxiliary scanning directions. The third lens 23 is long in the main scanning direction and has a positive power substantially only in the auxiliary scanning direction. The first and second lenses 21 and 22 are arranged adjacent to the polygon mirror 4, and the third lens 23 is arranged adjacent to the surface 5 to be scanned.

The lens surface of the first lens 21 at the side of the polygon mirror 4 is a diffractive surface 21a on which a diffractive lens structure is formed for compensating lateral chromatic aberration caused by the refractive lens. The shape of the diffractive surface 21a can be defined as a combination of a base curve of the refractive lens element and an additional optical path length added by the diffractive lens structure. The base curve is defined as a macroscopic shape of the diffractive surface 21a that does not include the diffractive lens structure. The additional optical path length is determined by an optical path difference function that continuously varies with a distance from the optical axis Ax1 of the fθ lens 20.

The base curve of the diffractive surface 21a is a rotationally-asymmetrical aspherical surface that is defined as a locus when a non-circular arc curve located within the main scanning plane is moved in the auxiliary scanning direction. The diffractive lens structure is a discontinuous surface that is similar to a Fresnel lens. A large number of concentric relief patterns, each of which has a wedge sectional shape, are formed on the base curve.

Figure 3:
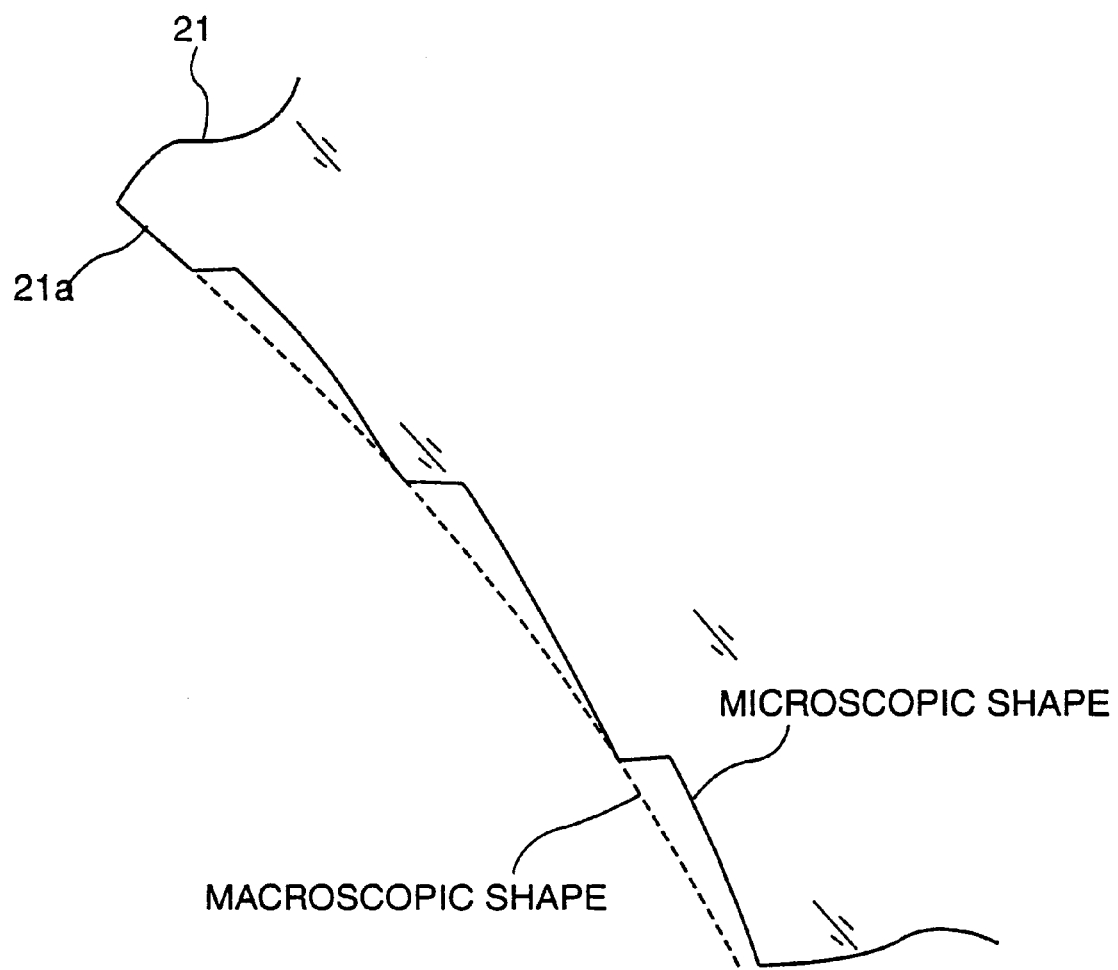
FIG. 3 is a diagram showing a macroscopic and microscopic shapes of a surface on which a diffraction lens structure is formed.

FIG. 3 is an enlarged cross sectional view showing the microscopic shape of the diffraction lens structure. The macroscopic shape corresponds to the base curve indicated by a broken line, and the microscopic shape is indicated by solid line.

The optical path difference function is asymmetrical with respect to the optical axis Ax1 of the fθ lens 20 in the main scanning direction. Namely, the optical path difference function is represented by a polynomial having odd order terms. Further, while the absolute value of the additional optical path length increases with distance from the optical axis Ax1 of the fθ lens 20 in the main scanning direction, the gradient of the optical path difference function in the side of the beam incident on the polygon mirror 4 is greater than that in the other side with respect to the optical axis Ax1.

In the scanning optical system of the embodiment, since the central axis Ax0 of the beam incident on the polygon mirror 4 exists in the main scanning plane and it travels along the path that is different from the optical axis Ax1 of the fθ lens 20, the deflecting point moves in the direction of the optical axis Ax1 of the fθ lens and in the main scanning direction. Since the displacement of the deflecting point is asymmetrical with respect to the optical axis Ax1 of the fθ lens 20, the lateral chromatic aberration on the surface 5 to be scanned varies asymmetrically when the diffractive lens structure is symmetrical with respect to the optical axis Ax1. On the other hand, when the diffractive lens structure has the asymmetrical component as described above, it can be counterbalanced with the asymmetrical displacement of the deflecting point, which can reduce the asymmetrical component of the lateral chromatic aberration.

The lens surface 21b of the first lens 21 at the side of the surface 5 to be scanned is a rotationally-symmetrical aspherical surface. The second lens 22 has a flat surface 22a at the side of the polygon mirror 4 and a convex spherical surface 22b at the side of the surface 5 to be scanned. The lens surface 23a of the third lens 23 at the side of the polygon mirror 4 is a modified toric surface that is defined as a locus when the non-circular arc curve is rotated about a rotation axis that is perpendicular to the optical axis Ax1 and exists in the main scanning plane. The lens surface 23b of the third lens 23 at the side of the surface 5 to be scanned is a convex spherical surface.

The following TABLE 1 represents the numerical figure of the scanning optical system of the embodiment on the side of the surface 5 to be scanned with respect to the cylindrical lens 3. In the table, ry denotes a radius of curvature (unit: mm) of a surface in the main scanning direction, rz denotes a radius of curvature (unit: mm) of a surface in the auxiliary scanning direction (which will be omitted if a surface is a rotationally-symmetrical surface), d denotes a distance (unit: mm) between surfaces along the optical axis Ax0 or Ax1, n denotes a refractive index of the element at a design wavelength.

Surface numbers 1 and 2 represent the cylindrical lens 3, a surface number 3 represents the reflection surface of the polygon mirror 4, surface numbers 4 and 5 represent the first lens 21, surface numbers 6 and 7 represent the second lens 22, and surface numbers 8 and 9 represent the third lens 23.

TABLE 1

Width of scanning 320 mm Design wavelength 780 nm

| Surface Number | ry | rz | d | n |
|---|---|---|---|---|
| 1 | ∞ | 50.000 | 4.000 | 1.51072 |
| 2 | ∞ | — | 94.500 | |
| 3 | ∞ | — | 50.000 | |
| 4 | −111.618 | ∞ | 7.000 | 1.48617 |
| 5 | −96.000 | — | 2.000 | |
| 6 | ∞ | — | 15.000 | 1.76591 |
| 7 | −198.191 | — | 110.000 | |
| 8 | −600.000 | 33.200 | 5.000 | 1.48617 |
| 9 | −691.278 | — | 87.100 | |

The non-circular arc curve that defines the base curve diffractive surface 21a (surface number 4) of the lens 21 is defined by the following equation (1):

$$X(Y) = \frac{cY^2}{1 + \sqrt{1 - (1+K)c^2Y^2}} + Am_4Y^4 + Am_6Y^6 + Am_8Y^8 + Am_{10}Y^{10} \quad (1)$$

X(Y) is a sag, that is, a distance of a curve from a tangential plane at a point on the surface where the distance from the optical axis in the main scanning direction is Y. Symbol c is a curvature (1/r) of the vertex of the curve, K is a conic constant, $Am_4$, $Am_6$, $Am_8$ and $Am_{10}$ are aspherical surface coefficients of fourth, sixth, eighth and tenth orders, respectively.

Further, the lens surface 21b (surface number 5) of the first lens 21 at the side of the surface 5 to be scanned is a rotationally-symmetrical aspherical surface that is defined by the following equation (2):

$$X(h) = \frac{ch^2}{1 + \sqrt{1 - (1+K)c^2h^2}} + A_4h^4 + A_6h^6 + A_8h^8 + A_{10}h^{10} \quad (2)$$

X(h) is a sag, that is, a distance of a surface from a tangential plane at a point on the surface where the height from the optical axis is h. Symbol c is a curvature (1/r) of the vertex of the surface, K is a conic constant, $A_4$, $A_6$, $A_8$ and $A_{10}$ are aspherical surface coefficients of fourth, sixth, eighth and tenth orders, respectively.

Still further, the shape the modified toric surface 23a (surface number 8) in the main scanning plane is also defined by the equation (1) and the shape in the auxiliary scanning direction is defined by the following equation (3):

$$cz(Y) = cz_0 + As_1Y + As_2Y^2 + As_3Y^3 + As_4Y^4 + As_5Y^5 + As_6Y^6 \quad (3)$$

Symbol cz(Y) is a curvature in the auxiliary scanning direction at a point where the distance from the optical axis in the main scanning direction is Y. Symbol $cz_0$ is a curvature in the auxiliary scanning direction on the optical axis, $As_1$, $As_2$, $As_3$, $As_4$, $As_5$ and $As_6$ are curvature coefficients of first through sixth orders, respectively.

It should be noted that the radius of curvature of each of the aspherical surfaces and the modified toric surface indicated in TABLE 1 is a value of each of optical elements on the optical axis. The constants and the coefficients of these surface are described in TABLE 2.

TABLE 2

| Surface number | K | $Am_x$, $A_x$, $As_x$ | |
|---|---|---|---|
| 4 | 2.80000 | $Am_4 = -1.34003 \times 10^{-06}$ | $Am_6 = 3.39002 \times 10^{-10}$ |
| | | $Am_8 = 1.73320 \times 10^{-14}$ | $Am_{10} = 0.00000$ |
| 5 | 1.02810 | $A_4 = -1.00953 \times 10^{-06}$ | $A_6 = 1.26196 \times 10^{-10}$ |
| | | $A_8 = 2.76373 \times 10^{-14}$ | $A_{10} = -1.01541 \times 10^{-18}$ |
| 8 | 0.00000 | $Am_4 = 1.23948 \times 10^{-08}$ | $Am_6 = 1.05642 \times 10^{-13}$ |
| | | $Am_8 = -1.42802 \times 10^{-17}$ | |
| | | $As_1 = -4.13787 \times 10^{-06}$ | $As_2 = -9.06131 \times 10^{-7}$ |
| | | $As_4 = 3.83665 \times 10^{-11}$ | $As_6 = -8.20890 \times 10^{-16}$ |
| | | $As_3 = As_5 = 0.00000$ | |

The optical function of the diffractive lens structure of the diffractive surface 21a is expressed by the optical path difference function that is defined by the following equation (4).

$$\Delta\phi(Y) = \sum_{i=1}^{10} P_i Y^i \quad (4)$$

$\Delta\phi(Y)$ is an additional optical path length added by the diffractive lens structure at a point where a distance from the optical axis in the main scanning direction is Y, $P_i$ is an optical path difference coefficient of i-th order (first through tenth). In the other words, $\Delta\phi(Y)$ is an optical path difference between an imaginary ray that is assumed not to be diffracted by the diffracting lens structure and a ray that is diffracted by the diffractive lens structure.

The optical path difference function is represented by a polynomial having odd order terms to have an asymmetrical component with respect to the optical axis Ax1. The optical path difference coefficients of the embodiment are described in the following TABLE 3.

TABLE 3

| $P_2$ | $-2.400 \times 10^{-1}$ | $P_5$ | $7.088 \times 10^{-9}$ | $P_8$ | $2.781 \times 10^{-12}$ |
| $P_3$ | $-5.078 \times 10^{-5}$ | $P_6$ | $-1.614 \times 10^{-8}$ | $P_9$ | $-1.320 \times 10^{-14}$ |
| $P_4$ | $-2.065 \times 10^{-5}$ | $P_7$ | $-7.292 \times 10^{-12}$ | $P_{10}$ | $-5.857 \times 10^{-16}$ |

Figure 4:
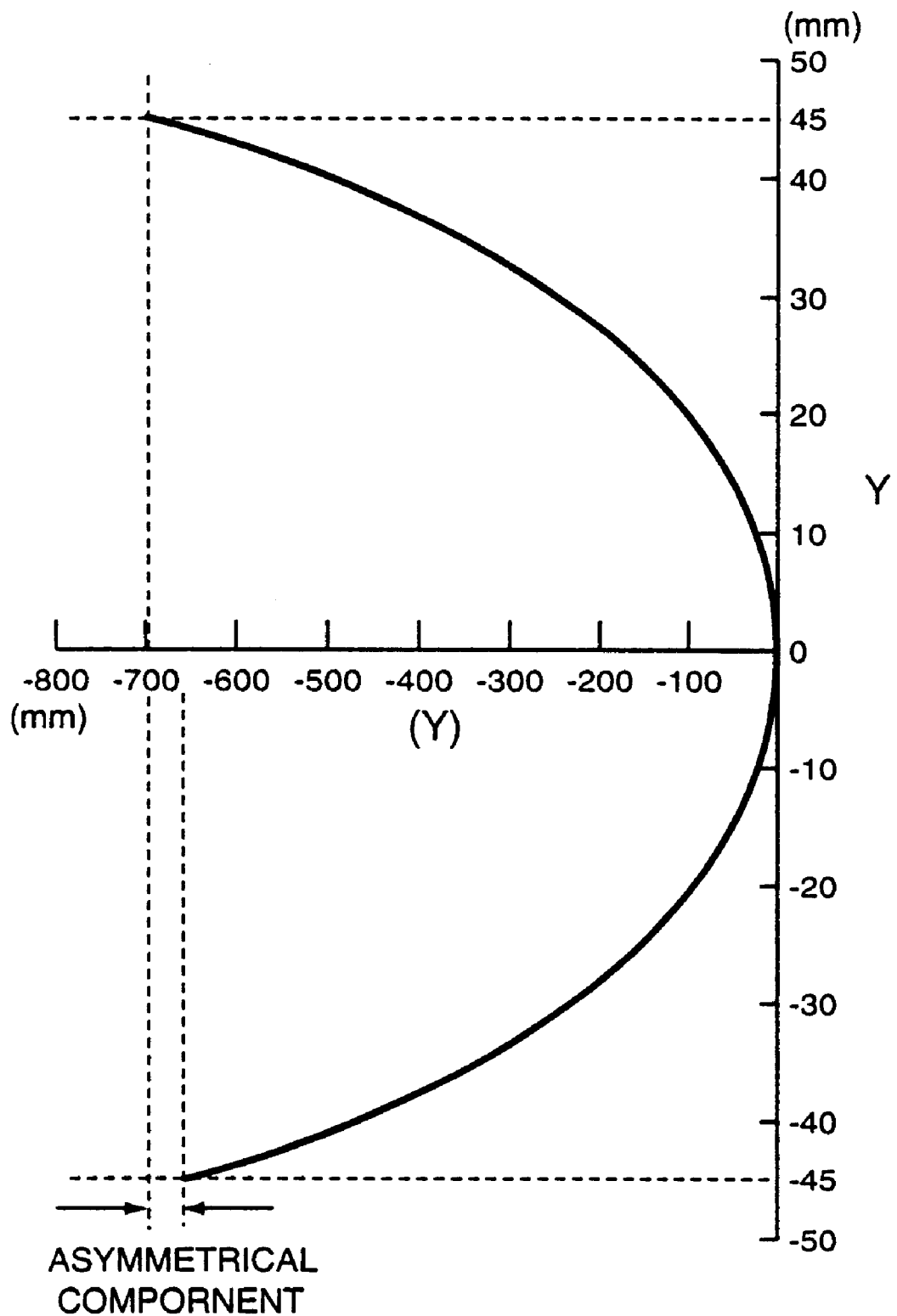
FIG. 4 is a graph showing a relationship between an additional optical path length added by a diffractive lens structure and a distance from an optical axis in the main scanning direction, according to the embodiment.

The following TABLE 4 represents the additional optical path length $\Delta\phi(Y)$ at a point where a distance from the optical axis in the main scanning direction is Y, and the symmetrical component and the asymmetrical component thereof. The minus sign of the distance Y represents the side of the beam incident on the polygon mirror 4 and the plus sign represents the other side with respect to the optical axis Ax1 of the fθ lens 20. As described in TABLE 4, while the absolute value of the additional optical path length increases with distance from the optical axis Ax1 of the fθ lens in the main scanning direction, the gradient of the additional optical path length in the side of the minus sign of the distance Y is greater than that in the side of the plus sign. FIG. 4 is a graphical representation of TABLE 4, that is, it shows the relationship between the distance Y (unit: mm) from the optical axis in the main direction and the additional optical path length Δϕ(Y) (unit: λ).

TABLE 4

| | Additional Optical path length | | |
|---|---|---|---|
| Distance Y | Total | Symmetrical component | Asymmetrical component |
| 45 | −693.9 | −677.8 | −16.0 |
| 40 | −498.0 | −490.9 | −7.2 |
| 35 | −353.3 | −350.0 | −3.3 |
| 30 | −244.6 | −243.0 | −1.6 |
| 25 | −162.5 | −161.6 | −0.8 |
| 20 | −100.7 | −100.3 | −0.4 |
| 15 | −55.4 | −55.2 | −0.2 |
| 10 | −24.3 | −24.2 | 0.0 |
| 5 | −6.0 | −6.0 | 0.0 |
| 0 | 0.0 | 0.0 | 0.0 |
| −5 | −6.0 | −6.0 | 0.0 |
| −10 | −24.2 | −24.2 | 0.0 |
| −15 | −55.1 | −55.2 | 0.2 |
| −20 | −99.9 | −100.3 | 0.4 |
| −25 | −160.8 | −161.6 | 0.8 |
| −30 | −241.4 | −243.0 | 1.6 |
| −35 | −346.7 | −350.0 | 3.3 |
| −40 | −483.7 | −490.9 | 7.2 |
| −45 | −661.8 | −677.8 | 16.0 |

The actual shape of the diffractive lens structure is provided with steps in the optical axis direction at the position where the additional optical path length Δϕ(Y) is equal to the integral multiple of the wavelength. That is, the diffractive lens structure is similar to a Fresnel lens having a plurality of concentric relief patterns. The optical path difference given at the steps is determined based upon the diffraction order and the wavelength in use.

A diffractive lens structure can be regarded as equivalence to a refractive lens having a negative Abbe's number in view of its chromatic aberration correction effect. Thus, when the diffractive lens structure is used together with refractive lenses, the chromatic aberration can be compensated. Dispersion of the diffractive lens structure has a value outside a range which lens material for the refraction lens can have. In other words, the Abbe's number of the diffraction lens structure equals −3.453, it is possible to sufficiently correct the chromatic aberration even though the diffractive lens structure has a relatively low power.

Further, since the optical path difference function varies asymmetrically with respect to the optical axis in the main scanning direction, the asymmetrical component of the lateral chromatic aberration can be reduced.

Figure 5A:
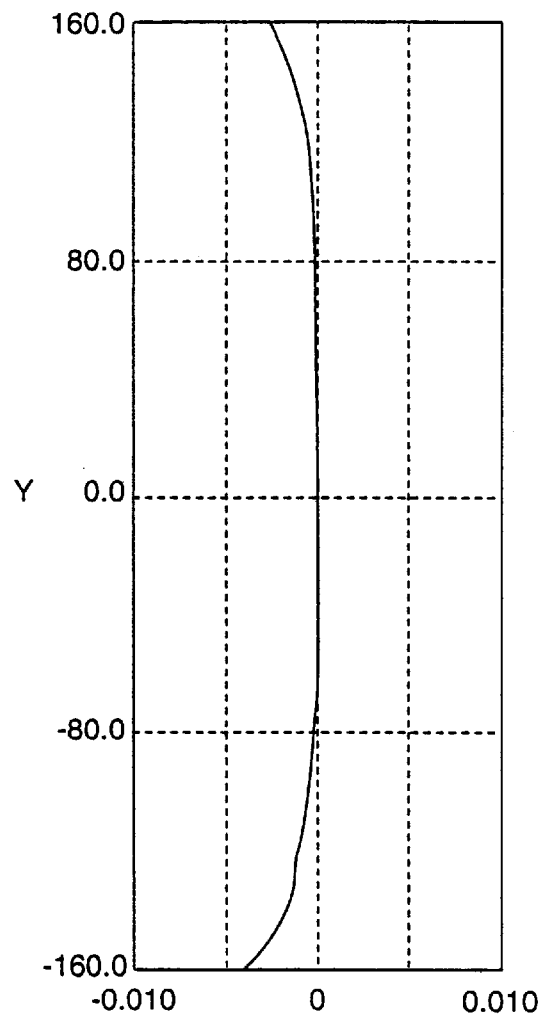
FIG. 5A is a graph showing lateral chromatic aberration when the diffractive lens structure is symmetrical with respect to the optical axis.
Figure 5B:
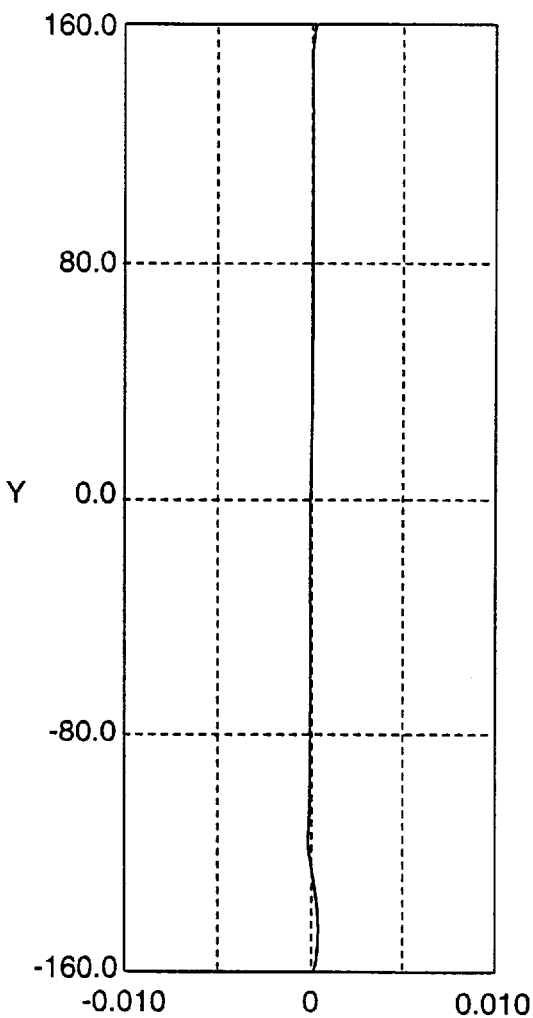
FIG. 5B is a graph showing lateral chromatic aberration when the diffractive lens structure is asymmetrical with respect to the optical axis.

FIG. 5A is a graph showing lateral chromatic aberration when the diffractive lens structure includes only the symmetrical component of TABLE 4, and FIG. 5B is a graph showing lateral chromatic aberration when the diffractive lens structure includes both the symmetrical and asymmetrical components. In these graphs, the lateral chromatic aberration is represented by a difference from the scanning position of the laser beam at wavelength 780 nm to that at wavelength 765 nm. The axis of ordinate of each graph represents an image height (height of scanning spot on the surface 5 to be scanned from a point where the optical axis intersects the surface 5 to be scanned), the axis of abscissa represents the amount of the lateral chromatic aberration, and the unit is millimeter for both axes.

As is evident from FIGS. 5A and 5B, the asymmetrical component provided for the optical path difference function is counterbalanced with the asymmetrical displacement of the deflecting point, which can reduce the lateral chromatic aberration to an extremely low level.

Still more, the problem of the lateral chromatic aberration comes up not only in the writing device as described above but also in a reading device that employs a white light source for illuminating an object.

Figure 6:
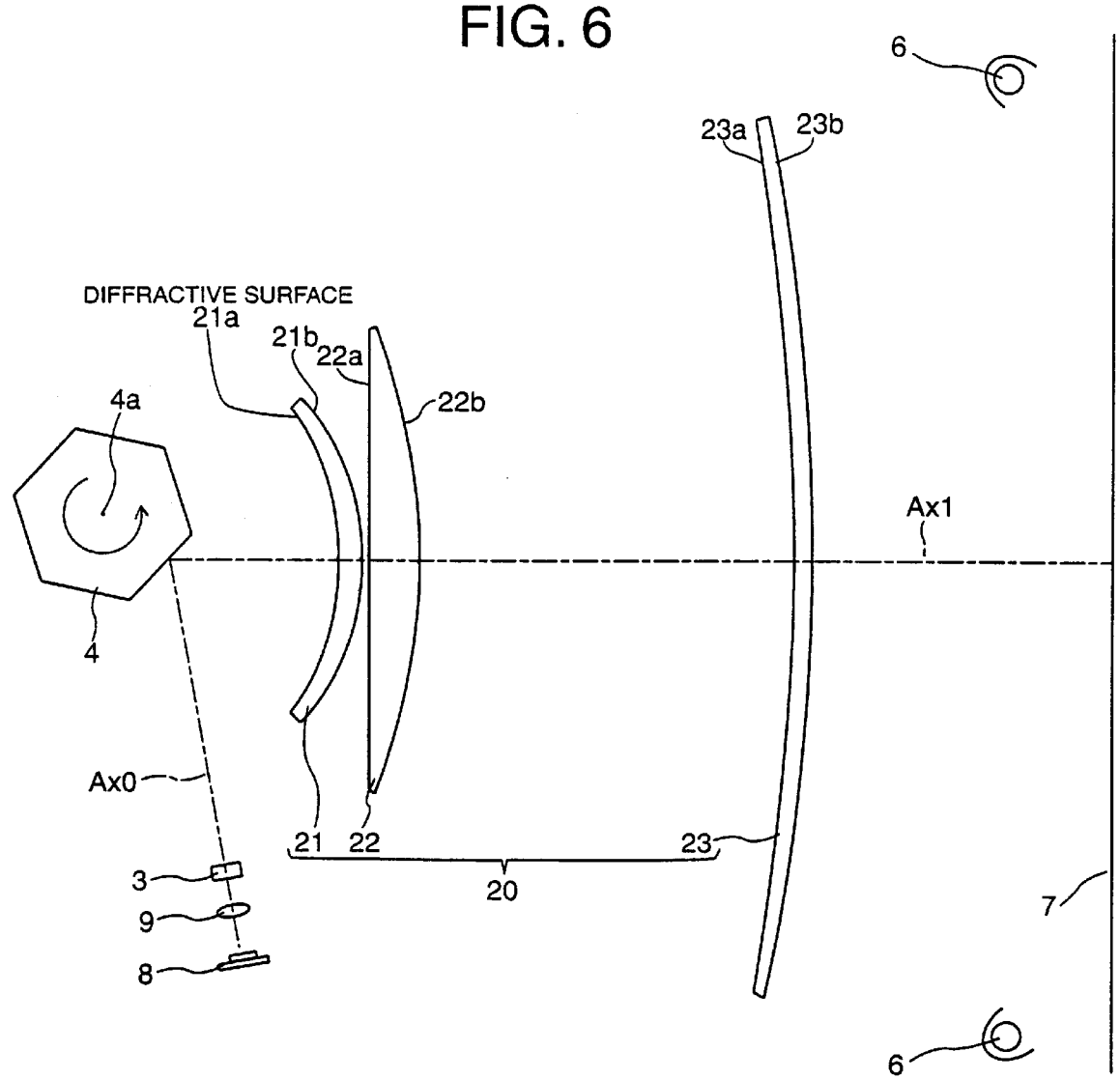
FIG. 6 is a diagram showing an arrangement of optical elements of a scanning optical system of a reading device viewed in the main scanning plane, embodying the invention.

FIG. 6 is a diagram showing an arrangement of optical elements of a scanning optical system viewed in the main scanning plane. The fθ lens 20 of the embodiment of FIG. 1 is also applied to the optical system of FIG. 6. An optical system of a reading device includes white light sources 6 located adjacent to an object surface 7. A light from an object surface 7 passes through the fθ lens 20. The deflected light by the polygon mirror 4 is received by a photodetector 8 at a fixed position through the cylindrical lens 3 and a condenser lens 9. The fθ lens 20 is provided with the diffractive lens structure as is the case of the embodiment of FIG. 1. While the absolute value of the optical path difference function increases with distance from the optical axis of the fθ lens in the main scanning direction, the gradient of the function in the side of the light incident on the photodetector 8 is greater than that in the other side with respect to the optical axis Ax1. Thus, the asymmetrical displacement of the deflecting point is counterbalanced, which can reduce the lateral chromatic aberration.

The present disclosure relates to subject matter contained in Japanese Patent Application No. HEI 11-331953, filed on Nov. 22, 1999, which is expressly incorporated herein by reference in its entirety.

What is claimed is:

1. A scanning lens, comprising:
   a refractive lens, which includes at least one lens element, having a positive power as a whole; and
   a diffractive lens structure that is formed on at least one lens surface of said refractive lens for compensating a lateral chromatic aberration caused by said refractive lens,
   wherein said diffractive lens structure is defined by an optical path difference function that is asymmetrical with respect to the optical axis of said refractive lens in a main scanning direction along which a light beam scans.

2. The scanning lens according to claim 1, wherein said optical path difference function is represented by a polynomial having odd order terms.

3. A scanning optical system for a writing device, comprising:
   a light source portion;
   a deflector that deflects a beam emitted from said light source portion; and
   a scanning lens that converges said beam deflected by said deflector onto a surface to be scanned, said scanning lens comprising a refractive lens, which includes at least one lens element, having a positive power as a whole, and a diffractive lens structure that is formed on at least one lens surface of said refractive lens for compensating a lateral chromatic aberration caused by said refractive lens,
   wherein said diffractive lens structure is defined by an optical path difference function that is asymmetrical with respect to the optical axis of said refractive lens in a main scanning direction along which a light beam scans.

4. The scanning optical system according to claim 3, wherein a central axis of the beam incident on said deflector exists in a main scanning plane that is perpendicular to a rotation axis of said deflector and in which the optical axis of said scanning lens exists, and wherein said beam incident on said deflector travels along a path that is different from said optical axis.

5. The scanning optical system according to claim 4, wherein while the absolute value of an additional optical path length determined by said optical path difference function increases with distance from the optical axis of said scanning lens in said main scanning direction, the gradient of said function in the side of said beam incident on said deflector is greater than that in the other side with respect to said optical axis.

6. A scanning optical system for a reading device, comprising:
- a scanning lens through which a light from an object to be read passes, said scanning lens comprising a refractive lens, which includes at least one lens element, having a positive power as a whole, and a diffractive lens structure that is formed on at least one lens surface of said refractive lens for compensating a lateral chromatic aberration caused by said refractive lens;
- a deflector that deflects a light passed through said scanning lens; and
- a photodetector that receives said light deflected by said deflector at a fixed position,
- wherein said diffractive lens structure is defined by an optical path difference function that is asymmetrical with respect to the optical axis of said refractive lens in a main scanning direction along which said object is scanned.

7. The scanning optical system according to claim 6, wherein a central axis of the light incident on said photodetector exists in a main scanning plane that is perpendicular to a rotation axis of said deflector, and wherein said light incident on said photodetector travels along a path that is different from said optical axis.

8. The scanning optical system according to claim 7, wherein while the absolute value of an additional optical path length determined by said optical path difference function increases with distance from the optical axis of said scanning lens in said main scanning direction, the gradient of said function in the side of said light incident on said photodetector is greater than that in the other side with respect to said optical axis.

9. The scanning optical system according to claim 3, said optical path difference function of said diffractive lens structure being represented by a polynomial having odd order terms.

10. The scanning optical system according to claim 6, said optical path difference function of said diffractive lens structure being represented by a polynomial having odd order terms.

* * * * *